(12) United States Patent
Zhang et al.

(10) Patent No.: US 8,886,991 B2
(45) Date of Patent: Nov. 11, 2014

(54) SECTOR FAILURE PREDICTION METHOD AND RELATED SYSTEM

(71) Applicant: LSI Corporation, Milpitas, CA (US)

(72) Inventors: Fan Zhang, Milpitas, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 274 days.

(21) Appl. No.: 13/661,201

(22) Filed: Oct. 26, 2012

(65) Prior Publication Data

US 2014/0122923 A1 May 1, 2014

(51) Int. Cl.
*G06F 11/00* (2006.01)
*G06F 11/18* (2006.01)

(52) U.S. Cl.
CPC ..................................... *G06F 11/181* (2013.01)
USPC .......................................... 714/6.13; 714/47.3

(58) Field of Classification Search
CPC .............................. G06F 11/22; G06F 11/3037
USPC .................... 714/47.3, 6.13, 704, 710; 360/54
See application file for complete search history.

(56) References Cited

U.S. PATENT DOCUMENTS

| | | | |
|---|---|---|---|
| 6,223,303 B1 * | 4/2001 | Billings et al. | 714/6.13 |
| 6,405,323 B1 * | 6/2002 | Lin et al. | 714/6.13 |
| 6,697,977 B2 * | 2/2004 | Ozaki | 714/710 |
| 6,975,468 B1 * | 12/2005 | Melrose et al. | 360/31 |
| 7,032,127 B1 * | 4/2006 | Egan et al. | 714/6.13 |
| 7,274,639 B1 * | 9/2007 | Codilian et al. | 369/53.17 |
| 8,266,497 B1 * | 9/2012 | Kou et al. | 714/758 |
| 8,589,760 B1 * | 11/2013 | Kou et al. | 714/763 |
| 2004/0218440 A1 * | 11/2004 | Kumar et al. | 365/202 |
| 2007/0226599 A1 * | 9/2007 | Motwani | 714/792 |
| 2009/0203373 A1 * | 8/2009 | Alvarez Medina et al. | 455/423 |
| 2010/0185906 A1 * | 7/2010 | Rauschmayer et al. | 714/719 |
| 2010/0238779 A1 * | 9/2010 | Chen et al. | 369/53.42 |
| 2012/0047396 A1 * | 2/2012 | Garani et al. | 714/6.12 |
| 2013/0297983 A1 * | 11/2013 | Wang et al. | 714/752 |
| 2013/0332794 A1 * | 12/2013 | Yen et al. | 714/758 |
| 2014/0068368 A1 * | 3/2014 | Zhang et al. | 714/752 |

* cited by examiner

*Primary Examiner* — Joshua Lohn
(74) *Attorney, Agent, or Firm* — Suiter Swantz pc llo

(57) ABSTRACT

A method and system is disclosed for identification and removal of a memory sector prone to failure. The method performs satisfaction checks on the memory sector and monitors and stores returned Unsatisfied Checks (USC) for analysis by a pattern recognition algorithm. Once a first global iteration is pattern matched with a second global iteration from the sector, the method determines the period of the repetitive pattern. The method then identifies, as the sector prone to failure, the sector having the defined pattern and period. Once identified, the method uses a power management scheme to remove the sector prone to failure from further use by the memory system and displays to a user the details of the action taken.

20 Claims, 17 Drawing Sheets gind=0 lind=0: 88 1 3 5 14 15 16 17 22 24 27 29 35 41 43 45 53 58 66 67 68 71 72 74 75 77 78 79 80 89 90 91 92 94 101 102 107 108 109 111 112 115 117 121 125 131 135 139 143 146 151 152 153 156 164 167 169 179 182 187 201 203 204 206 209 211 212 213 215 216 220 222 223 224 226 228 230 233 236 239 244 245 253 254 264 267 279 280
gind=0 lind=1: 50 3 17 24 35 36 44 45 58 66 71 77 90 92 94 105 106 108 110 112 121 125 131 135 139 143 151 152 158 159 169 179 182 187 203 204 208 209 224 225 228 230 233 239 244 247 254 263 267 278 281
gind=0 lind=2: 41 2 3 9 17 24 36 44 58 66 71 74 77 90 97 105 106 110 112 121 135 136 139 143 151 158 162 169 178 182 204 230 233 239 241 244 245 254 263 267 278 281
gind=0 lind=3: 23 2 25 44 45 55 66 71 74 77 88 106 121 135 178 230 233 239 245 254 265 267 281 284
gind=0 lind=4: 19 25 44 45 66 71 74 77 121 151 162 187 230 233 239 245 254 267 281 284 ← 212
gind=0 lind=5: 11 2 66 74 77 111 121 151 167 239 245 267
gind=0 lind=6: 7 44 55 151 187 233 267 284
gind=0 lind=7: 9 54 55 66 151 169 219 233 239 267
gind=0 lind=8: 5 54 55 187 233 267
gind=0 lind=9: 4 55 219 233 267
gind=1 lind=0: 54 1 14 15 24 29 33 35 44 45 53 55 68 71 74 76 77 79 88 89 106 107 110 111 117 121 122 131 135 139 143 152 156 162 164 167 177 178 182 187 201 203 213 224 226 230 239 241 245 253 264 265 267 278 279
gind=1 lind=1: 27 1 2 15 44 45 55 74 88 98 106 139 151 152 162 177 178 182 187 212 224 230 239 241 245 253 254 267
gind=1 lind=2: 14 25 44 66 74 88 106 111 169 178 182 187 245 265 267
gind=1 lind=3: 6 44 187 233 265 267 284
gind=1 lind=4: 6 44 187 233 265 267 284
gind=1 lind=5: 7 44 55 151 187 233 267 284
gind=1 lind=6: 7 16 88 151 187 233 265 284
gind=1 lind=7: 7 16 54 151 182 187 233 265
gind=1 lind=8: 5 55 151 187 233 267
gind=1 lind=9: 5 54 55 187 233 267

200 gind=2 lind=0: 55 1 14 15 24 29 33 35 44 45 53 55 68 71 74 75 76 77 79 88 89 107 110 111 117 121 122 131 135 139 143 152 156 162 164 167 177 178 182 187 201 203 209 213 224 226 230 239 241 245 253 264 265 267 278 279
gind=2 lind=1: 27 1 2 15 44 45 55 74 88 98 106 139 151 152 162 177 178 182 187 212 224 230 239 241 245 253 254 267
gind=2 lind=2: 14 25 44 66 74 88 106 111 169 178 182 187 245 265 267
gind=2 lind=3: 9 15 44 177 187 224 233 265 267 284
gind=2 lind=4: 6 44 187 233 265 267 284
gind=2 lind=5: 7 44 55 151 187 233 267 284
gind=2 lind=6: 8 88 151 182 187 233 265 267 284
gind=2 lind=7: 6 16 151 182 187 233 265
gind=2 lind=8: 5 55 151 187 233 267
gind=2 lind=9: 5 54 55 187 233 267
gind=3 lind=0: 55 1 14 15 24 29 33 35 44 45 53 55 68 71 74 75 76 77 79 88 89 107 110 111 117 121 122 131 135 139 143 152 156 162 164 167 177 178 182 187 201 203 209 213 224 226 230 239 241 245 253 264 265 267 278 279
gind=3 lind=1: 27 1 2 15 44 45 55 74 88 98 106 139 151 152 162 177 178 182 187 212 224 230 239 241 245 253 254 267
gind=3 lind=2: 14 25 44 66 74 88 106 111 169 178 182 187 245 265 267
gind=3 lind=3: 9 15 44 177 187 224 233 265 267 284
gind=3 lind=4: 6 44 187 233 265 267 284
gind=3 lind=5: 7 44 55 151 187 233 267 284
gind=3 lind=6: 8 88 151 182 187 233 265 267 284
gind=3 lind=7: 6 16 151 182 187 233 265
gind=3 lind=8: 5 55 151 187 233 267
gind=3 lind=9: 5 54 55 187 233 267

204

206

FIG. 2B gind=4 lind=0: 55 1 14 15 24 29 33 35 44 45 53 55 68 71 74 75 76 77 79 88 89 107 110 111 117 121 122 131 135 139 143 152 156 162 164 167 177 178 182 187 201 203 209 213 224 226 230 239 241 245 253 264 265 267 278 279
gind=4 lind=1: 27 1 2 15 44 45 55 74 88 98 106 139 151 152 162 177 178 182 187 212 224 230 239 241 245 253 254 267
gind=4 lind=2: 14 25 44 66 74 88 106 111 169 178 182 187 245 265 267
gind=4 lind=3: 9 15 44 177 187 224 233 265 267 284
gind=4 lind=4: 6 44 187 233 265 267 284
gind=4 lind=5: 7 44 55 151 187 233 267 284
gind=4 lind=6: 8 88 151 182 187 233 265 267 284
gind=4 lind=7: 6 16 151 182 187 233 265
gind=4 lind=8: 5 55 151 187 233 267
gind=4 lind=9: 5 54 55 187 233 267
gind=5 lind=0: 55 1 14 15 24 29 33 35 44 45 53 55 68 71 74 75 76 77 79 88 89 107 110 111 117 121 122 131 135 139 143 152 156 162 164 167 177 178 182 187 201 203 209 213 224 226 230 239 241 245 253 264 265 267 278 279
gind=5 lind=1: 27 1 2 15 44 45 55 74 88 98 106 139 151 152 162 177 178 182 187 212 224 230 239 241 245 253 254 267
gind=5 lind=2: 14 25 44 66 74 88 106 111 169 178 182 187 245 265 267
gind=5 lind=3: 9 15 44 177 187 224 233 265 267 284
gind=5 lind=4: 6 44 187 233 265 267 284
gind=5 lind=5: 7 44 55 151 187 233 267 284
gind=5 lind=6: 8 88 151 182 187 233 265 267 284
gind=5 lind=7: 6 16 151 182 187 233 265
gind=5 lind=8: 5 55 151 187 233 267
gind=5 lind=9: 5 54 55 187 233 267

FIG. 2C gind=0 lind=0: 88 1 3 5 14 15 16 17 22 24 27 29 35 41 43 45 53 58 66 67 68 71 72 74 75 77 78 79 80 89 90 91 92 94 101 102 107 108 109 111 112 115 117 121 125 131 136 137 140 143 146 151 152 153 156 164 167 169 179 182 187 201 203 204 206 209 211 212 213 215 216 220 222 223 224 226 228 230 233 236 239 244 245 253 254 264 267 279 280 gind=0 lind=1: 50 3 17 24 35 36 44 45 58 66 71 77 90 92 94 105 106 108 110 112 121 125 131 135 139 143 151 152 158 159 169 179 182 187 203 204 208 209 224 225 228 230 233 239 244 247 254 263 267 278 281 gind=0 lind=2: 41 2 3 9 17 24 36 44 58 66 71 74 77 90 97 105 106 110 112 121 135 136 139 143 151 158 162 169 178 182 204 230 233 239 241 244 245 254 263 267 278 281 gind=0 lind=3: 23 2 25 44 45 55 66 71 74 77 88 106 121 135 178 230 233 239 245 254 265 267 281 284 gind=0 lind=4: 19 25 44 45 66 71 74 77 121 151 162 187 230 233 239 245 254 267 281 284 gind=0 lind=5: 11 2 66 74 77 111 121 151 167 239 245 267 gind=0 lind=6: 7 44 55 151 187 233 267 284 gind=0 lind=7: 9 54 55 66 151 169 219 233 239 267 gind=0 lind=8: 5 54 55 187 233 267 gind=0 lind=9: 4 55 219 233 267 gind=1 lind=0: 54 1 14 15 24 29 33 35 44 45 53 55 68 71 74 76 77 79 88 89 106 107 110 111 117 121 122 131 135 139 143 152 156 162 164 167 177 178 182 187 201 203 213 224 226 230 239 241 245 253 264 265 267 278 279

502 gind=0 lind=0 75 49 28 66 76 81 142 158 170 191 197 226 258 268 340 341 342 348 450 502 591 594 650 682 846 925 1031 1151 1184 1269 1302 1309 1404 1479 1484 1552 1559 1564 1692 1799 1878 2021 2050 2087 2094 2189 2193 2380 2485 2488 2562 gind=0 lind=1 43 30 28 66 81 191 197 258 268 341 342 380 450 545 650 846 1031 1151 1184 1269 1372 1404 1564 1664 1878 2021 2050 2094 2193 2380 2510 2562 gind=0 lind=2 30 30 28 66 81 191 197 258 268 341 342 450 650 846 900 924 974 1031 1151 1184 1404 1564 1664 1878 1923 2021 2050 2094 2193 2485 2510 2562 gind=0 lind=3 29 24 28 66 81 191 197 258 268 342 450 846 900 1151 1184 1309 1404 1564 1664 1878 2050 2094 2193 2485 2510 2562 gind=0 lind=4 24 19 28 66 81 191 258 268 450 650 846 1151 1184 1404 1564 1878 2050 2094 2193 2562 2669 gind=0 lind=5 28 20 28 66 81 191 226 258 450 454 650 846 1151 1184 1378 1404 1564 1878 2050 2094 2189 2193 gind=0 lind=6 31 20 28 34 66 81 191 226 450 454 650 846 1151 1184 1372 1404 1564 1664 1878 2050 2052 2510 gind=0 lind=7 27 16 28 81 150 191 226 450 454 846 900 1151 1184 1404 1564 1878 2050 2510 gind=0 lind=8 23 17 28 66 191 226 450 846 900 1031 1151 1404 1564 1878 2052 2094 2193 2510 2574 gind=0 lind=9 17 14 28 66 81 191 342 450 846 900 1151 1564 1878 2050 2052 2193 gind=1 lind=0 49 31 28 66 81 191 197 226 258 268 450 502 591 594 650 682 846 900 1151 1184 1302 1316 1404 1559 1564 1692 1799 1878 1923 2050 2094 2193 2485 gind=1 lind=1 23 19 28 66 81 191 258 450 650 900 1151 1184 1404 1564 1878 1923 2050 2052 2094 2193 2350 gind=1 lind=2 21 20 28 66 81 191 258 268 450 650 846 900 1151 1184 1404 1564 1878 1923 2050 2052 2094 2193 gind=1 lind=3 19 18 28 66 81 150 191 268 450 846 900 1151 1564 1878 1923 2050 2052 2193 2350 2510 gind=1 lind=4 18 16 28 66 191 268 450 846 900 1151 1564 1878 1923 2050 2052 2094 2193 2542 gind=1 lind=5 14 15 28 66 150 191 268 450 846 900 1151 1564 1878 1923 2050 2052 2193 gind=1 lind=6 13 19 28 34 66 81 150 191 268 450 846 900 1110 1151 1564 1806 1878 1923 2050 2052 2193 gind=1 lind=7 14 18 28 66 81 150 191 268 450 846 900 1110 1151 1564 1827 1878 1923 2050 2052 2193 gind=1 lind=8 15 17 28 34 66 81 191 268 450 844 900 1110 1439 1564 1878 1923 2050 2052 2380 gind=1 lind=9 12 15 28 34 66 150 191 450 900 1110 1564 1827 1878 1923 2050 2052 2193

FIG. 5A

```
gind=2 lind=0 47 29 28 66 81 191 197 226 268 450 502 591 594 650 682 846 900 1151 1184 1302 1404 1559 1564
1692 1799 1878 1923 2050 2094 2193 2485
gind=2 lind=1 24 18 28 66 81 191 450 650 900 1151 1184 1404 1564 1878 1923 2050 2052 2094 2193 2350
gind=2 lind=2 17 18 28 66 81 191 268 450 846 900 1151 1404 1564 1878 1923 2050 2052 2090 2094 2193
gind=2 lind=3 14 17 28 66 81 150 191 268 450 846 900 1151 1564 1878 1923 2050 2052 2193 2350
gind=2 lind=4 14 19 28 66 81 150 191 268 450 846 900 1110 1151 1378 1564 1878 1923 2050 2052 2094 2193
gind=2 lind=5 13 16 28 66 81 150 191 268 450 846 900 1110 1151 1564 1878 1923 2050 2052 2193
gind=2 lind=6 13 17 28 34 66 150 191 268 450 846 900 1110 1151 1564 1806 1878 1923 2050 2052
gind=2 lind=7 13 18 28 34 66 81 150 191 268 450 846 900 1110 1151 1564 1827 1878 1923 2050 2052
gind=2 lind=8 15 15 28 34 66 150 191 268 450 846 900 1110 1564 1878 1923 2052 2193
gind=2 lind=9 11 11 28 34 66 191 450 900 1474 1564 1878 2050 2052
gind=3 lind=0 51 31 28 66 81 191 197 226 258 268 450 502 591 594 613 650 682 846 900 1151 1184 1302 1404
1559 1564 1692 1799 1878 1923 2050 2094 2193 2485
gind=3 lind=1 23 19 28 66 81 191 258 450 650 900 1151 1184 1404 1564 1878 1923 2050 2052 2094 2193 2350
gind=3 lind=2 22 21 28 66 81 191 258 268 450 650 846 900 1151 1404 1564 1878 1923 2050 2052 2090 2094 2193
2510
gind=3 lind=3 21 18 28 66 81 150 191 268 450 846 900 1151 1184 1564 1878 1923 2050 2052 2193 2510
gind=3 lind=4 18 18 28 66 150 191 268 450 846 900 1110 1151 1564 1878 1923 2050 2052 2094 2193 2542
gind=3 lind=5 16 17 28 66 81 150 191 268 364 450 846 900 1151 1184 1564 1878 1923 2052 2193
gind=3 lind=6 18 17 28 34 66 150 191 268 450 846 900 1110 1184 1564 1878 1923 2050 2052 2193
gind=3 lind=7 14 16 28 66 81 150 191 268 450 846 900 1110 1564 1878 1923 2050 2052 2193
gind=3 lind=8 14 14 28 34 66 191 450 846 900 1151 1564 1878 1923 2050 2052 2193
gind=3 lind=9 12 11 28 66 150 191 450 900 1151 1564 1878 2050 2052
```

510 gind=4 lind=0 48 30 28 66 81 191 197 226 258 268 450 502 591 594 650 682 846 900 1151 1184 1302 1404 1559 1564 1692 1799 1878 1923 2050 2094 2193 2485 gind=4 lind=1 23 19 28 66 81 191 258 450 650 900 1151 1184 1404 1564 1878 1923 2050 2052 2094 2193 2350 gind=4 lind=2 22 21 28 66 81 191 258 268 450 650 846 900 1151 1404 1564 1878 1923 2050 2052 2090 2094 2193 2510 gind=4 lind=3 21 18 28 66 81 150 191 268 450 846 900 1151 1184 1564 1878 1923 2050 2052 2193 2510 gind=4 lind=4 18 18 28 66 150 191 268 450 846 900 1110 1151 1564 1878 1923 2050 2052 2094 2193 2542 gind=4 lind=5 16 17 28 66 81 150 191 268 364 450 846 900 1151 1184 1564 1878 1923 2050 2052 2094 2193 gind=4 lind=6 17 18 28 34 66 81 150 191 268 450 846 900 1110 1184 1564 1878 1923 2050 2052 2193 gind=4 lind=7 13 15 28 66 81 150 191 268 450 846 900 1110 1564 1878 1923 2052 2193 gind=4 lind=8 13 11 28 66 191 450 900 1564 1878 1923 2050 2052 2193 gind=4 lind=9 14 13 28 66 150 191 450 900 1151 1564 1878 1923 2050 2052 2193 gind=5 lind=0 48 30 28 66 81 191 197 226 258 268 450 502 591 594 650 682 846 900 1151 1184 1302 1404 1559 1564 1692 1799 1878 1923 2050 2094 2193 2485 gind=5 lind=1 23 18 28 66 81 191 450 650 900 1151 1184 1404 1564 1878 1923 2050 2052 2094 2193 2350 gind=5 lind=2 20 20 28 66 81 191 258 268 450 650 846 900 1151 1404 1564 1878 1923 2050 2052 2090 2094 2193 gind=5 lind=3 20 17 28 66 81 150 191 450 846 900 1151 1184 1564 1878 1923 2050 2052 2193 2510 gind=5 lind=4 17 18 28 66 150 191 268 450 846 900 1151 1110 1151 1378 1564 1878 1923 2050 2052 2094 2193 gind=5 lind=5 19 18 28 34 66 81 150 191 268 450 846 900 1151 1184 1564 1878 1923 2050 2052 2193 gind=5 lind=6 14 17 28 34 66 150 191 268 450 846 900 1110 1564 1827 1878 1923 2050 2052 2193 gind=5 lind=7 14 16 28 66 81 150 191 268 450 900 1110 1564 1827 1878 1923 2052 2193 gind=5 lind=8 14 13 28 34 66 191 268 450 900 1110 1564 1878 1923 2050 2052 gind=5 lind=9 12 11 28 66 150 191 450 900 1151 1564 1878 2050 2052

512 gind=6 lind=0  0 48 30 28 66 81 191 197 226 258 268 450 502 591 594 650 682 846 900 1151 1184 1302 1404 1559 1564 1692 1799 1878 1923 2050 2094 2193 2485
gind=6 lind=1  23 19 28 66 81 191 258 450 650 900 1151 1184 1404 1564 1878 1923 2050 2052 2094 2193 2350
gind=6 lind=2  22 22 28 66 81 191 258 268 450 650 846 900 1151 1184 1404 1564 1878 1923 2050 2052 2090 2094 2193 2510
gind=6 lind=3  21 18 28 66 81 150 191 268 450 846 900 1151 1184 1564 1878 1923 2050 2052 2193 2510
gind=6 lind=4  18 18 28 66 150 191 268 450 846 900 1110 1151 1564 1878 1923 2050 2052 2094 2193 2542
gind=6 lind=5  16 17 28 66 81 150 191 268 450 846 900 1151 1184 1564 1878 1923 2050 2052 2193
gind=6 lind=6  16 19 28 34 66 81 150 191 268 450 846 900 1110 1184 1564 1827 1878 1923 2050 2052 2193
gind=6 lind=7  14 16 28 66 81 150 191 268 450 846 900 1110 1564 1878 1923 2050 2052 2193
gind=6 lind=8  14 13 28 34 66 191 450 846 900 1110 1151 1564 1878 1923 2050 2052
gind=6 lind=9  13 13 28 66 150 191 450 900 1110 1151 1564 1878 1923 2050 2052

514 gind=7 lind=0  0 48 30 28 66 81 191 197 226 258 268 450 502 591 594 650 682 846 900 1151 1184 1302 1404 1559 1564 1692 1799 1878 1923 2050 2094 2193 2485
gind=7 lind=1  23 19 28 66 81 191 258 450 650 900 1151 1184 1404 1564 1878 1923 2050 2052 2094 2193 2350
gind=7 lind=2  22 21 28 66 81 191 258 268 450 650 846 900 1151 1404 1564 1878 1923 2050 2052 2090 2094 2193 2510
gind=7 lind=3  21 18 28 66 81 150 191 268 450 846 900 1151 1184 1564 1878 1923 2050 2052 2193 2510
gind=7 lind=4  18 18 28 66 150 191 268 450 846 900 1110 1151 1564 1878 1923 2050 2052 2094 2193 2542
gind=7 lind=5  16 17 28 66 81 150 191 268 364 450 846 900 1151 1184 1564 1878 1923 2050 2052 2193
gind=7 lind=6  17 18 28 34 66 81 150 191 268 450 846 900 1110 1184 1564 1878 1923 2050 2052 2193
gind=7 lind=7  13 15 28 66 81 150 191 268 450 846 900 1110 1564 1878 1923 2050 2052 2193
gind=7 lind=8  13 11 28 66 191 450 900 1564 1878 1923 2050 2052 2193
gind=7 lind=9  14 13 28 66 150 191 450 900 1151 1564 1878 1923 2050 2052 2193

{ 516 gind=8 lind=0 48 30 28 66 81 191 197 226 258 268 450 502 591 594 650 682 846 900 1151 1184 1302 1404 1559 1564 1692 1799 1878 1923 2050 2094 2193 2485
gind=8 lind=1 23 18 28 66 81 191 450 650 900 1151 1184 1404 1564 1878 1923 2050 2052 2094 2193 2350
gind=8 lind=2 20 20 28 66 81 191 258 268 450 650 846 900 1151 1404 1564 1878 1923 2050 2052 2090 2094 2193
gind=8 lind=3 20 17 28 66 81 150 191 450 846 900 1151 1184 1564 1878 1923 2050 2052 2193 2510
gind=8 lind=4 17 18 28 66 150 191 268 450 846 900 1110 1151 1378 1564 1878 1923 2050 2052 2094 2193
gind=8 lind=5 19 18 28 34 66 81 150 191 268 450 846 900 1151 1184 1564 1878 1923 2050 2052 2193
gind=8 lind=6 14 17 28 34 66 150 191 268 450 846 900 1110 1564 1878 1923 2050 2052 2193
gind=8 lind=7 14 16 28 66 81 150 191 268 450 846 900 1110 1564 1827 1878 1923 2052 2193
gind=8 lind=8 14 13 28 34 66 191 268 450 900 1110 1564 1878 1923 2050 2052
gind=8 lind=9 12 11 28 66 150 191 450 900 1151 1564 1878 2050 2052

{ 518 gind=9 lind=0 48 30 28 66 81 191 197 226 258 268 450 502 591 594 650 682 846 900 1151 1184 1302 1404 1559 1564 1692 1799 1878 1923 2050 2094 2193 2485
gind=9 lind=1 23 19 28 66 81 191 258 450 650 900 1151 1184 1404 1564 1878 1923 2050 2052 2094 2193 2350
gind=9 lind=2 22 22 28 66 81 191 258 268 450 650 846 900 1151 1184 1404 1564 1878 1923 2050 2052 2090 2094 2193 2510
gind=9 lind=3 21 18 28 66 81 150 191 268 450 846 900 1151 1184 1564 1878 1923 2050 2052 2193 2510
gind=9 lind=4 18 18 28 66 150 191 268 450 846 900 1110 1151 1564 1878 1923 2050 2052 2094 2193 2542
gind=9 lind=5 16 17 28 66 81 150 191 268 450 846 900 1151 1184 1564 1878 1923 2050 2052 2193
gind=9 lind=6 16 19 28 34 66 81 150 191 268 450 846 900 1110 1184 1564 1827 1878 1923 2050 2052 2193
gind=9 lind=7 14 16 28 66 81 150 191 268 450 846 900 1110 1184 1564 1878 1923 2050 2052 2193
gind=9 lind=8 14 13 28 34 66 191 450 846 900 1110 1564 1878 1923 2050 2052
gind=9 lind=9 13 13 28 66 150 191 450 900 1110 1151 1564 1878 1923 2050 2052

FIG. 5E

600 ⤹ gind=1 lind=0 49 31 28 66 81 191 197 226 258 268 450 502 591 594 650 682 846 900 1151 1184 1302 1316 1404 1559 1564 1692 1799 1878 1923 2050 2094 2193 2485 gind=1 lind=1 23 19 28 66 81 191 258 450 650 900 1151 1184 1404 1564 1878 1923 2050 2052 2094 2193 2350 gind=1 lind=2 21 20 28 66 81 191 258 268 450 650 846 900 1151 1184 1404 1564 1878 1923 2050 2052 2094 2193 gind=1 lind=3 19 18 28 66 81 150 191 268 450 846 900 1151 1564 1878 1923 2050 2052 2193 2350 2510 gind=1 lind=4 18 16 28 66 191 268 450 846 900 1151 1564 1878 1923 2050 2052 2094 2193 2542 gind=1 lind=5 14 15 28 66 150 191 268 450 846 900 1151 1564 1878 1923 2050 2052 2193 gind=1 lind=6 13 19 28 34 66 81 150 191 268 450 900 1110 1151 1564 1806 1878 1923 2050 2052 2193 gind=1 lind=7 14 18 28 66 81 150 191 268 450 846 900 1110 1151 1564 1827 1878 1923 2050 2052 2193 gind=1 lind=8 15 17 28 34 66 81 191 268 450 844 900 1110 1439 1564 1878 1923 2050 2052 2380 gind=1 lind=9 12 15 28 34 66 150 191 450 900 1110 1564 1827 1878 1923 2050 2052 2193 gind=2 lind=0 47 29 28 66 81 191 197 226 268 450 502 591 594 650 682 846 900 1151 1184 1302 1404 1559 1564 1692 1799 1878 1923 2050 2094 2193 2485

SECTOR FAILURE PREDICTION METHOD AND RELATED SYSTEM

TECHNICAL FIELD

The present disclosure relates generally to the field of management of storage sectors via the use of failure prediction algorithms. More specifically, embodiments of the present invention relate to a system and method for accurate sector failure prediction on Low-Density Parity Check (LDPC) codec iterative systems based on waveform analysis at various sector failure rates (SFR).

BACKGROUND

Finite server memory capacity may require an operator to accurately manage assets to ensure memory availability to additional resources. To ensure availability, accurate determination of whether and when a sector of memory may fail may aid the operator. This determination may enable the user to accurately target and remove from memory the failed sector or sector identified as one anticipated to fail. A method enabling a user to identify and prepare for a failed sector may enable the user to more efficiently manage finite storage assets.

Sectors which may unexpectedly fail may cause damage to a system or simply a loss of data. Undesirable data loss may contribute to an overall perception of instability and poor performance.

A certain percentage of power may be spent on failed sectors. In some situations, 3% to 11% of total power may be spent on failed sectors or on sectors identified as prone to failure. Power assets wasted on a failed sector may unnecessarily increase power required leading to decreased battery life, decreased productivity, and eventual increased costs.

Therefore, it would be advantageous if a method and system existed providing for user capability to accurately identify and predict a failure of a memory sector enabling the user to more efficiently manage storage assets.

SUMMARY

In a preferred embodiment, a method for identification of a sector prone to failure comprises performing a satisfaction check on at least one sector, receiving an indication of a satisfied check, receiving and storing an indication of an unsatisfied check. The method continues by storing a location of the unsatisfied check and a number of unsatisfied checks, for each one of a plurality of local iterations, storing the location of the unsatisfied check and the number of unsatisfied checks for each one of a plurality of global iterations, one global iteration being equal to 10 local iterations, and analyzing the number and location of the unsatisfied checks between a first global iteration and at least one other global iteration. The method continues by determining if a periodic pattern exists between the number and location of the unsatisfied checks in the first global iteration and number and location of the unsatisfied checks in the at least one other global iteration, and identifying, as the sector prone to failure, a sector having a determined periodic pattern. The method finally removes the identified sector from further use, and reports, to a user via a display, the number and location of the unsatisfied checks for the identified sector.

In an additional aspect of the current invention, a system for identification of a sector prone to failure comprises a computer readable medium having non-transitory computer readable program code embodied therein for identification of a sector prone to failure, the computer readable program code comprising instructions which, when executed by a computer device or processor, perform and direct the steps of: performing a satisfaction check on at least one sector, receiving an indication of a satisfied check, receiving and storing an indication of an unsatisfied check, and storing a location of the unsatisfied check and a number of unsatisfied checks, for each one of a plurality of local iterations. The system continues by storing the location of the unsatisfied check and the number of unsatisfied checks for each one of a plurality of global iterations, one global iteration being equal to 10 local iterations, and analyzing the number and location of the unsatisfied checks between a first global iteration and at least one other global iteration. The system continues by determining if a periodic pattern exists between the number and location of the unsatisfied checks in the first global iteration and number and location of the unsatisfied checks in the at least one other global iteration, and identifying, as the sector prone to failure, a sector having a determined periodic pattern. The system finally removes the identified sector from further use, and reports, to a user via a display, the number and location of the unsatisfied checks for the identified sector.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

The numerous advantages of the disclosure may be better understood by those skilled in the art by reference to the accompanying figures in which:

FIGS. 2A-2C are a list of unsatisfied checks (USC) locations in each local iteration at high signal to noise ratio (SNR) representative of a preferred embodiment of the present invention;

FIG. 3 is a compiled list of one section of high SNR USC locations, showing a pattern of USC locations representative of a preferred embodiment of the present invention;

FIGS. 5A-5E are a list of unsatisfied checks (USC) locations in each local iteration at low signal to noise ratio representative of a preferred embodiment of the present invention;

FIG. 6 is a compiled list of one section of low SNR USC locations, showing a pattern of USC locations representative of a preferred embodiment of the present invention;

DETAILED DESCRIPTION

Figure 1:
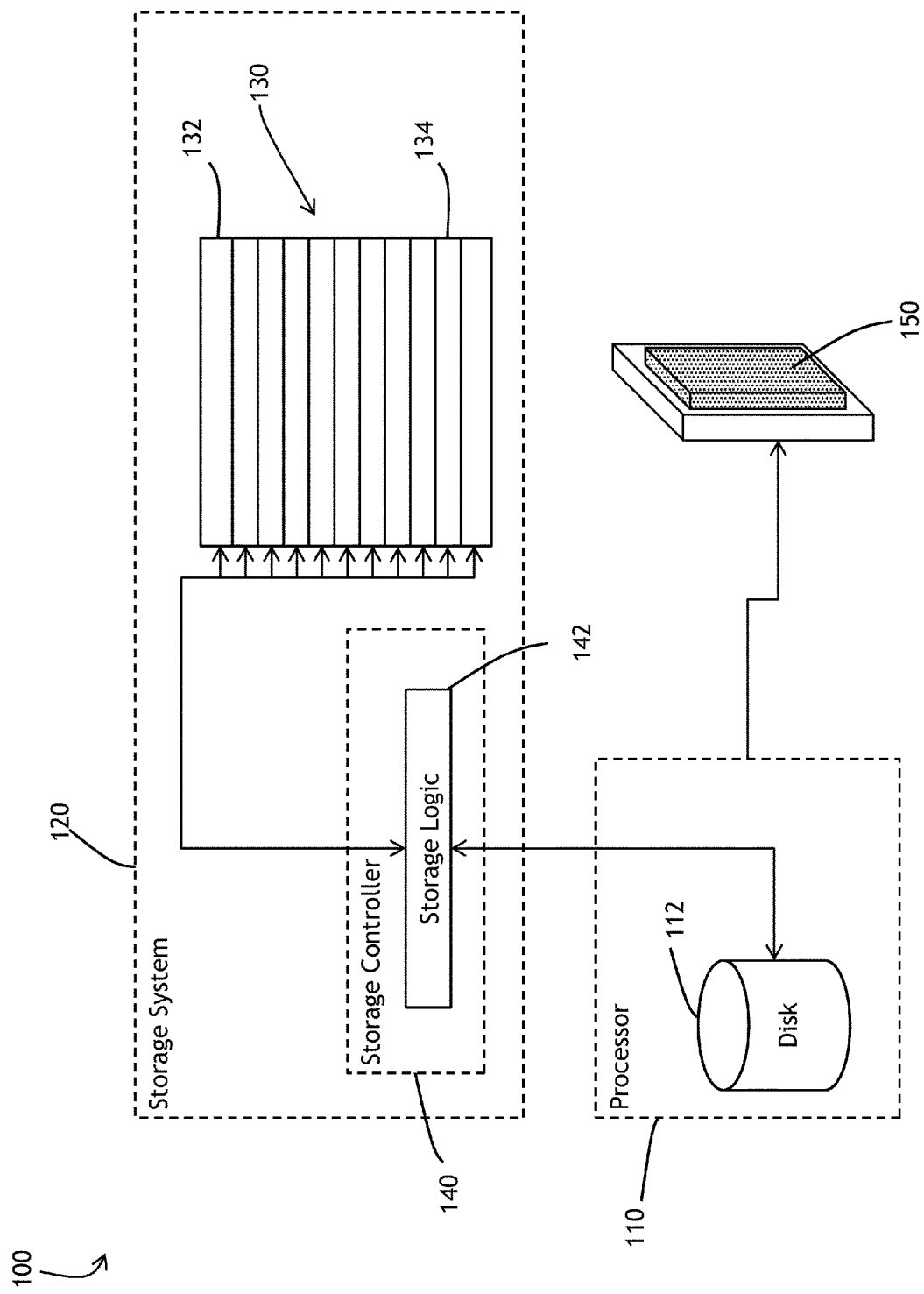
FIG. 1 is an overview of a system configured with a preferred embodiment of the present invention.

Reference will now be made in detail to the subject matter disclosed, which is illustrated in the accompanying drawings.

Embodiments of the present invention may provide the capability for automatically identifying a memory sector prone to failure at a point in the future. The identified memory sector may then be immediately removed or iteratively removed from service resulting in an ultimate power savings for the overall system. Additionally, embodiments of the present invention may provide for prompt identification and recovery of the identified sector within an ongoing operation.

Multi-channel architecture may be well known in the art of memory and storage design. Certain channels of a multi-channel design may support a wide number of iterations. A local iteration being defined herein as one round of variable-node processing and check-node processing in the LDPC code decoder. A number of local iterations may comprise a global iteration. As used herein, a global iteration may be defined as one round of detector processing and decoder processing. A global iteration may additionally comprise a plurality of local iterations. For example, one channel in a multi-channel architecture may support up to 120 global iterations. For each global iteration, this same channel may support 10 local iterations.

Monitoring each iteration of a sector for performance over time may allow tracking of the monitored sector's status. For example, a monitoring engine may periodically check each sector for performance. One measure of performance may include a satisfaction check. A result of a satisfaction check may return as a satisfied check (SC) or an unsatisfied check (USC). As used herein, a SC and an USC may be defined as an evaluation of a check node in a bipartite graph of the LDPC code as satisfied (SC) or not (USC).

In addition, each satisfaction check may return a location of the USC as the variable nodes corresponding to the data bits of a sector are evaluated. Such location may be in the form of a number, a physical location, a variable indicating a reference to a location, and the like. Also, each sector may return a plurality of USCs during a single local iteration. This number of USCs per local iteration may be of considerable importance to long term health of the sector.

One method of tracking USCs may include tracking a location of the USCs and the number of USCs returned from the sector during one local iteration. It is contemplated additional parameters returned from a satisfaction check may also reveal valuable information regarding the health of the sector.

Through analysis of USCs number and location of a sector over time, a user may determine if a monitored sector may fail at a point in the future. For example, storage and analysis of the number and location of USCs for a local iteration may reveal a short term picture of sector performance. However, for an accurate analysis of longer term performance and a possible view of a future sector failure, an analysis of USC over a plurality of global iterations as compared to other global iterations of the monitored sector may prove beneficial.

For example, a specific channel of a sector monitoring engine may monitor a plurality of sectors for 120 global iterations. Each global iteration may be comprised of a number of local iterations. For example, one global iteration may include 10 local iterations. For one local iteration, a certain number of USCs may be indicated. For example the local iteration may return 16 USCs at locations: 17 14 28 66 81 191 342 450 846 900 1151 1564 1878 2050 2052 2193. These 16 USCs and locations may be stored for follow on analysis. Coupled with USC from 9 additional iterations within the global iteration, the USCs from this first global iteration may be stored and compared to the USCs from a second global iteration to determine if a pattern match is present.

A matching pattern between USC from one global iteration to another global iteration may indicate pending failure of the monitored sector. For example, a pattern of USCs from a first global iteration may be an exact match with a pattern of USCs from a second global iteration. Such exact match may indicate failure of the sector at some future time. Although a future failure may be indicated by a pattern match, the match may indicate additional insight to a user.

A Sector Failure Rate (SFR) may also be indicated by such match of pattern dynamics between a first global iteration and a second global iteration. For example, a SFR of 1 e-3 to 1 e-5 may be indicated by matching pattern dynamics of a first Global iteration (G) with a second. Additionally, analysis of the period of matching global iteration patterns may be of importance.

Period length may also indicate when and if a sector may fail. For example, a periodic USC pattern (both the number of USC and the locations of USC) may indicate a sector which may fail after a relatively long schedule of iterations (e.g., >80 G).

A shorter period may indicate a lower relative sector fail rate. For example, a periodic pattern indicating a short period (e.g., 1 G) may foretell of a lower sector failure rate (e.g., 1e-5). One reason for short periods here may include a small number of trapping sets connected together.

A longer period may indicate a higher relative SFR. For example, a period of 3 G (e.g., an exact match every 3 global iterations), may indicate a higher SFR of 1 e-3. One reason for this higher rate may include a large number of trapping sets and non-trapping-set errors are connected together.

Referring to FIG. 1, an overview of a system configured with a preferred embodiment of the present invention is shown. System 100 may preferably include processor 110 operationally and digitally connected to storage system 120 and to display 150. Within processor 110 disk 112 may retain computer readable code for executing instructions of the method described herein. Within storage system 120, storage controller 140 may possess some storage logic 142 related to operation of the methods disclosed herein. Individual sectors 132 and 134 may be the monitored sectors the present invention may monitor and evaluate for USCs. Sectors 132 134 may be part of an overall sector storage cluster 130 enabling overall system 100 to efficiently store data.

Processor 110 may preferably execute instructions of system 100 to evaluate and check the status of the sectors 130. Processor 110 may execute satisfaction checks and store to the disk 112 results of the checks. Processor 110 may store the number and location of USCs to disk 112 for further analysis.

Alternatively, storage controller 140 may possess the logic 142 to fully carry out the instructions of system 100. Storage controller may function to execute satisfaction checks on each of the plurality of sectors in the cluster 130 and may store results of the checks. Storage controller 140 may evaluate sectors 132 and report results to processor 110 for further transmission to display 150.

Referring to FIG. 2A-2C, a list of unsatisfied checks (USC) locations in each local iteration at high signal to noise ratio (SNR) representative of a preferred embodiment of the present invention is shown. Each line may represent a local iteration 212 representative of the USCs returned for a specific sector. For example, the local iteration (gind=0 lind=4:) 212 indicates 20 USCs at locations: 19 25 44 45 66 71 74 77 121 151 162 187 230 233 239 245 254 267 281 284. This result may be contrasted with local iteration represented by line 214 (gind=1 lind=8) (Global iteration 1 and local iteration 8) returning a result of 5 USCs at locations: 5 55 151 187 233 267. The local iterations may be then analyzed as groups of 10 local iteration forming a global iteration. Global iterations such as those indicated by 202, 204, 206, 208, and 210 may be stored within disk 112 and available for further analysis by processor 110.

System 100 may preferably use a variety of well known pattern recognition methods to accomplish the task of pattern recognition. A skilled artisan may recognize such pattern recognition techniques as used herein to accomplish this task. Pattern analysis may alternatively include a comparison of global iteration 202 with each following global iteration, each previous global iteration, or any combination of comparisons.

Referring to FIG. 3, a compiled list of one section of high SNR USC locations, showing a pattern of USC locations representative of a preferred embodiment of the present invention is shown. A repetitive pattern may be indicated by numbers and locations of USCs returned from the monitored sector 132. For example, a first global iteration 202 may indicate the same pattern of USCs as global iteration 206 (FIG. 2B). This period of 1 may indicate a lower SFR for the monitored sector.

Figure 4:
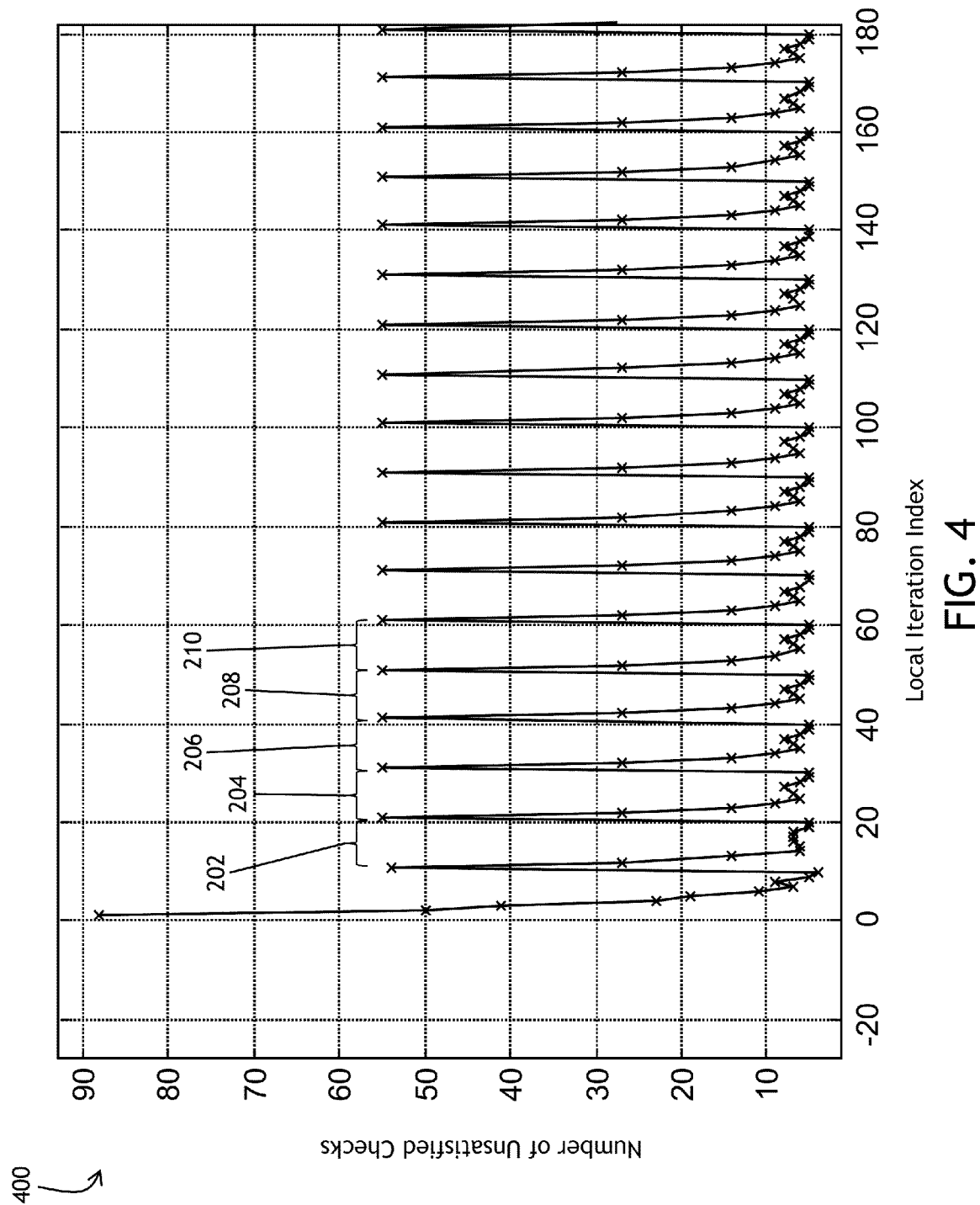
FIG. 4 is a graph of the number of local USCs per local iteration index at high SNR representative of a preferred embodiment of the present invention.

Referring to FIG. 4, a graph of the number of local USCs per local iteration index at high SNR representative of a preferred embodiment of the present invention is shown. As indicated numerically in FIG. 3, the graphical representation of each global iteration 202-210 in FIG. 4 may indicate a pattern match. Global iteration 204 may be visually similar to global iteration 206, and to 208 and so on. This repetitive pattern and period of 1 may indicate a lower SFR for the monitored sector.

Referring to FIG. 5A-5E, a list of unsatisfied checks (USC) locations in each local iteration at low signal to noise ratio representative of a preferred embodiment of the present invention is shown. Each local iteration may be analyzed as a group of 10 within one global iteration. Global iterations 502, 504, 506, 508, 510, 512, 514, 516, and 518 are shown indicating groups of local iterations available for analysis by system 100 as global iterations. As above, system 100 may preferably perform an analysis of the global iterations to determine whether a pattern and period of the pattern may exist.

Referring to FIG. 6, a compiled list of one section of low SNR USC locations, showing a pattern of USC locations representative of a preferred embodiment of the present invention is shown. A skilled observer will notice from the list of USCs a pattern develops as the list is compiled. Global iteration 502 may be dissimilar from each previous or following global iteration. However, global iteration 508 (FIG. 5C) may find a pattern match in global iteration 514 (FIG. 5D) with a repeating period of 3.

Figure 7:
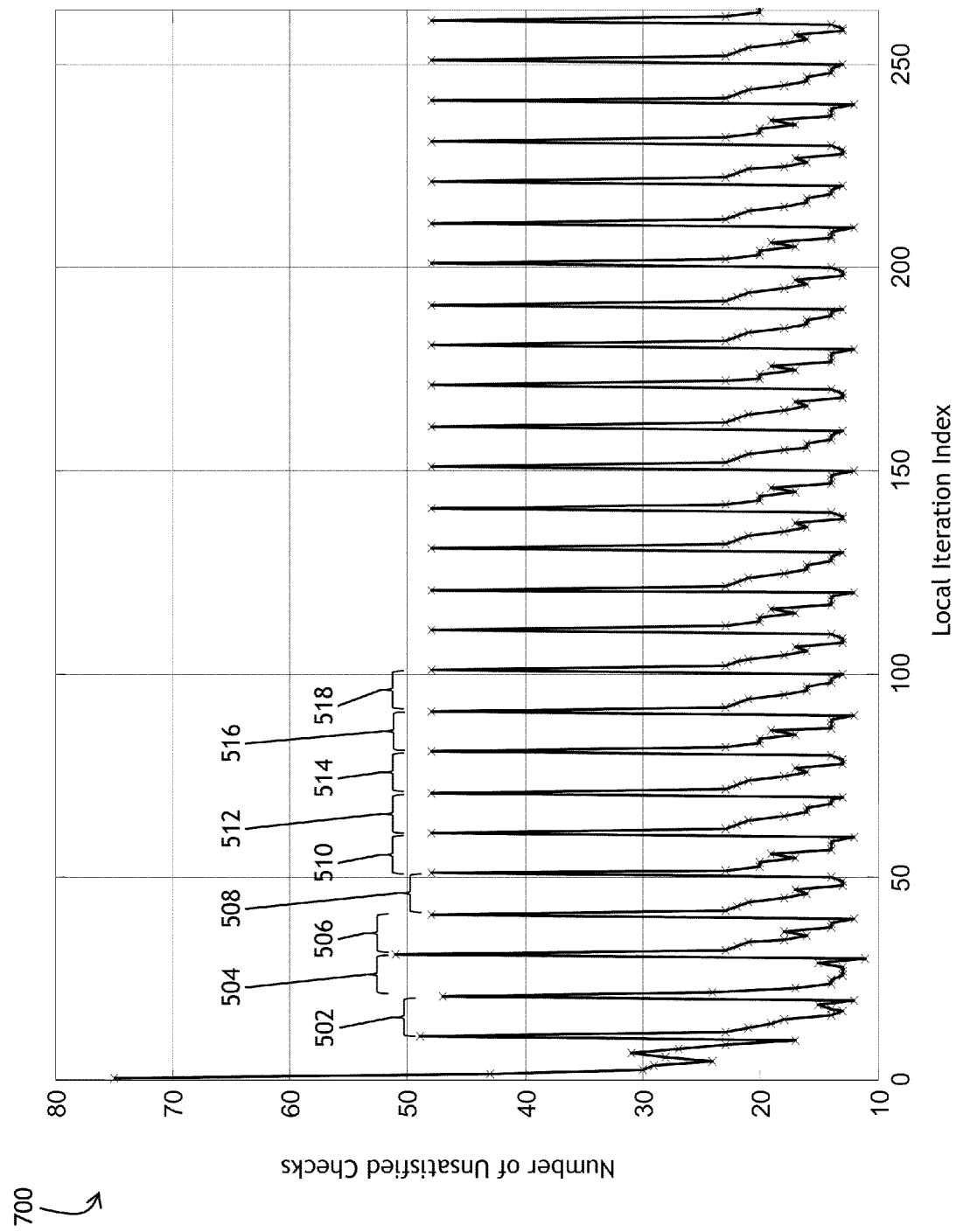
FIG. 7 is a graph of the number of local USCs per local iteration index at low SNR representative of a preferred embodiment of the present invention.

Referring to FIG. 7, a graph of the number of local USCs per local iteration index at low SNR representative of a preferred embodiment of the present invention is shown. Step 602 may comprise. A skilled observer may find the same pattern and period of 3 between global iterations 508 and 514, 510 and 516, and 512 and 518 here. As previously described, a longer period may indicate a higher SFR for the monitored sector. Once the sector identified as prone to failure, system 100 may execute a power management scheme to remove the sector from further operation.

Figure 8:
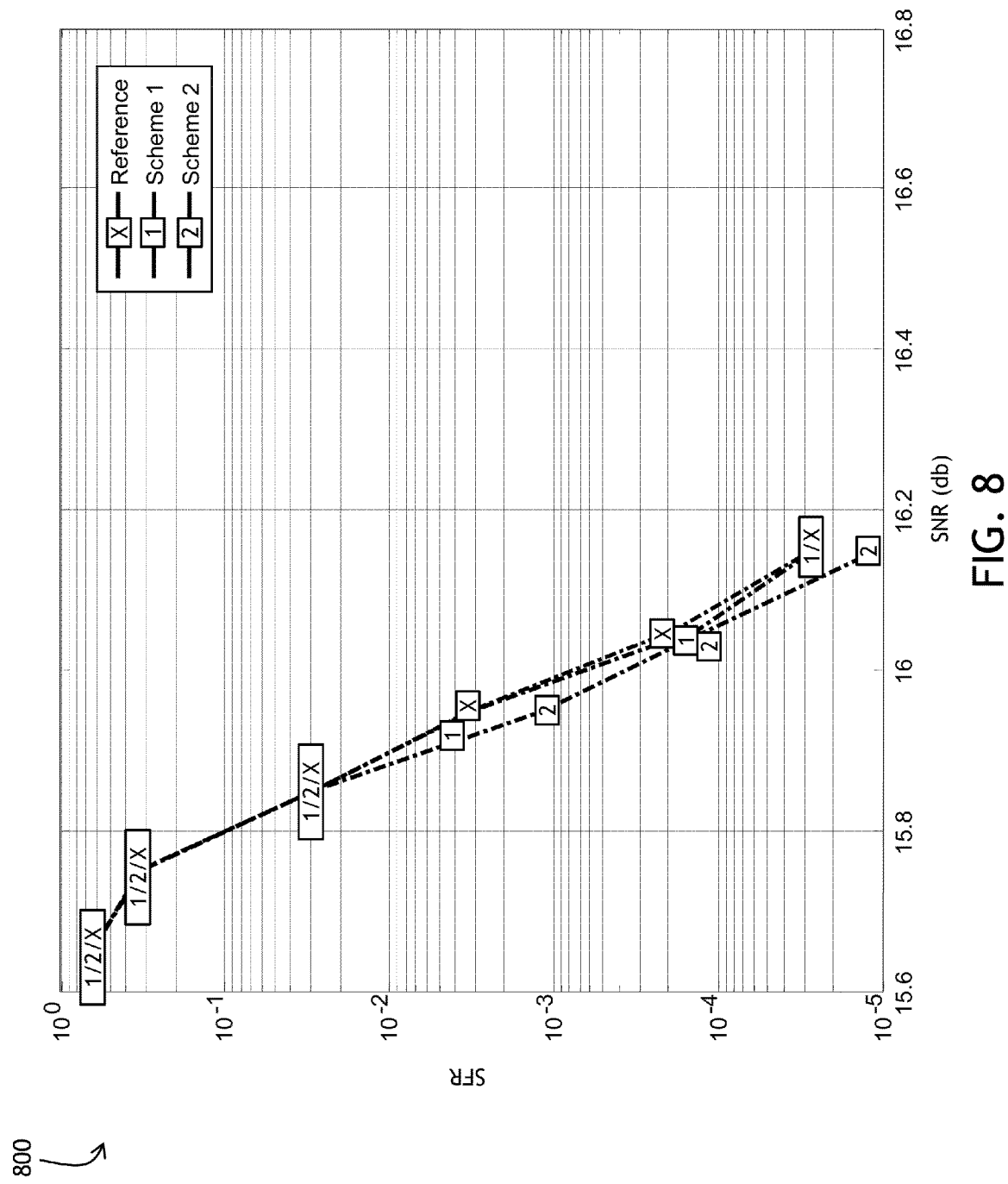
FIG. 8 is a graph of sector failure rate (SFR) over signal to noise ratio (SNR) in dB representative of two embodiments of the present invention.

Referring to FIG. 8, a graph of sector failure rate (SFR) over signal to noise ratio (SNR) in dB representative of two embodiments of the present invention is shown. A reference curve shows SFR without use of system 100. Scheme 1 may indicate immediate removal of a sector found to have a repeating pattern and defined period. Scheme 2 may offer an alternate embodiment where the identified sector is iteratively removed by one local iteration per each future global iteration until the identified sector is removed completely. For example, embodiments of the present invention may provide for changing the number of local iterations per global in a certain random way. This may help break the trapping sets and recover the failure.

In a preferred operation of scheme 1, a sector identified to have a pattern match and period of USCs may be immediately removed from service when positively identified. In this case, a potential greater power reduction may occur with no SFR loss in the overall system 100.

In an alternate embodiment, scheme 2 may iteratively reduce, by one local iteration, each future global iteration until the local iterations equal zero per global iteration. At this zero point, system 100 may remove the identified sector from future service. Under alternate scheme 2, it is contemplated system 100 may perceive some power reduction with SFR gain.

Figure 9:
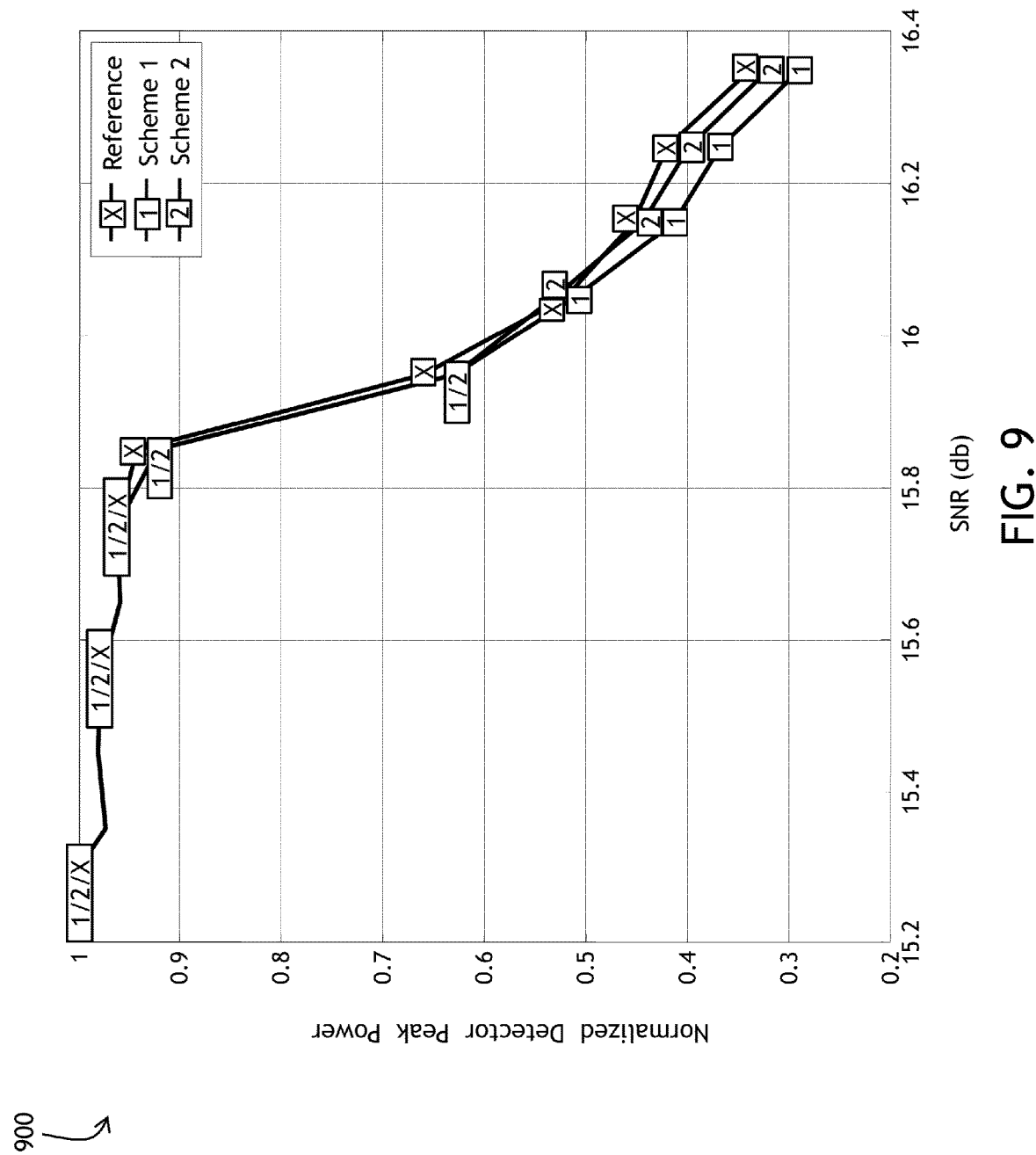
FIG. 9 is a graph of Normalized Detector Peak Power over SNR representative of two embodiments of the present invention.

Referring to FIG. 9, a graph of Normalized Detector Peak Power over SNR representative of two embodiments of the present invention is shown. At lower SNR, reference, scheme 1 and scheme 2 all represent nearly identical detector peak power values. However, it is contemplated results of power management schemes 1 and 2 may reveal a significant reduction in normalized detector peak power requirements at higher SNR near the 16.35 range.

Figure 10:
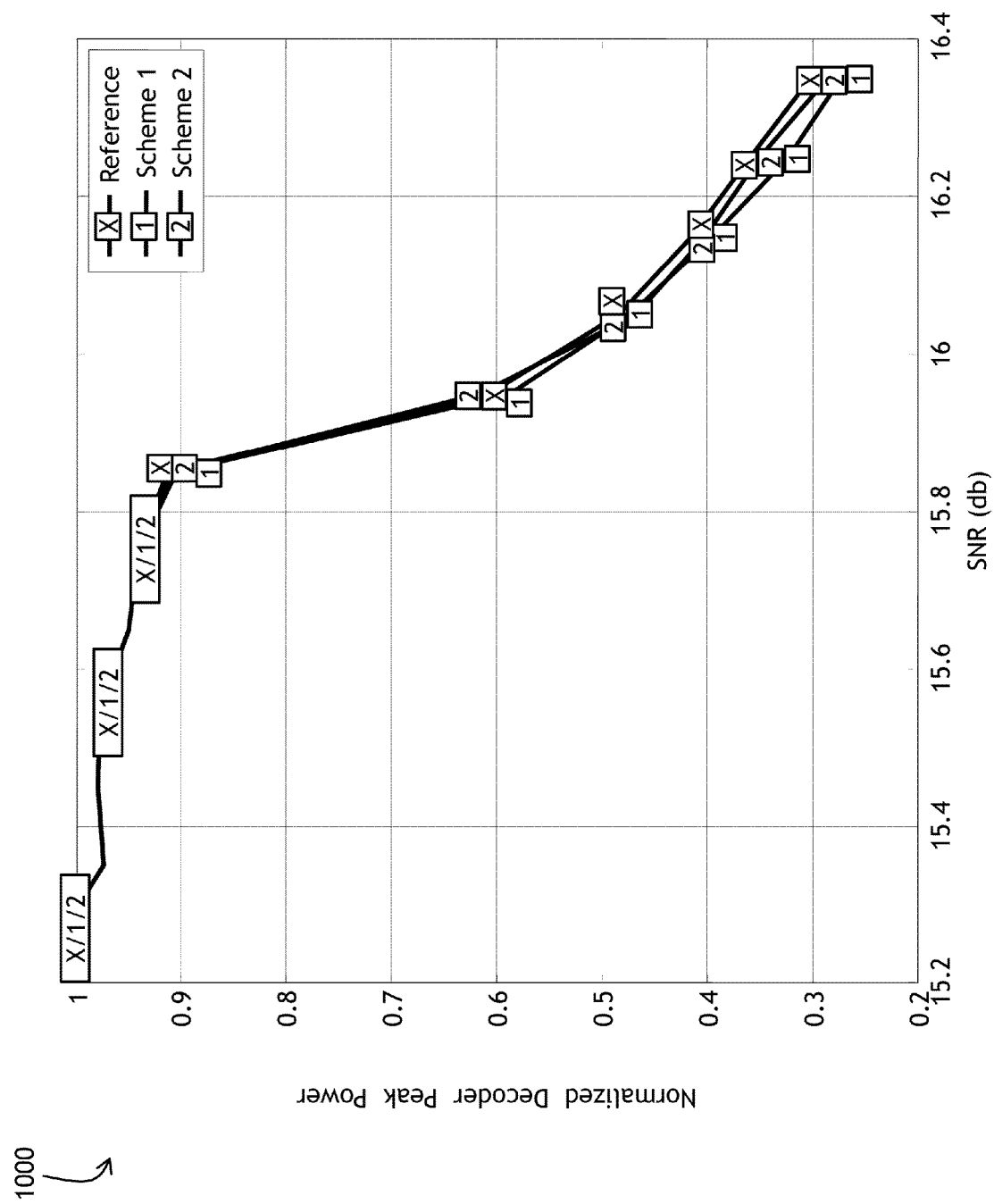
FIG. 10 is a graph of Normalized Decoder Peak Power over SNR representative of two embodiments of the present invention.

Referring to FIG. 10, a graph of Normalized Decoder Peak Power over SNR representative of two embodiments of the present invention is shown. Decoder peak power may follow nearly the same progression as detector power above. It is contemplated reference, scheme 1, and scheme 2 may follow the nearly identical path at lower SNR. At higher SNR, however, a significant power reduction may be realized by system 100 using scheme 1.

Figure 11:
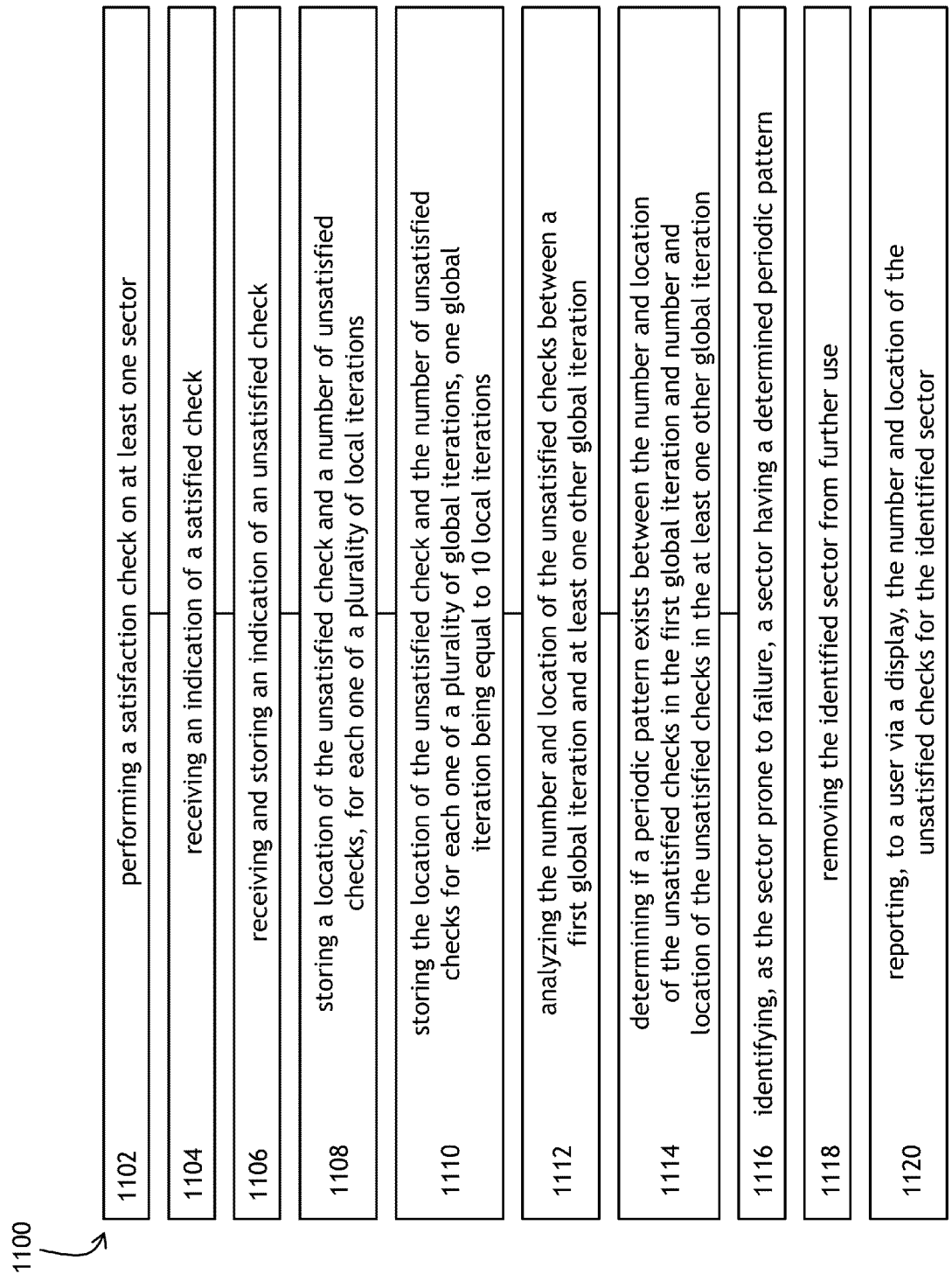
FIG. 11 is a flow diagram of a method for accurate prediction of sector failure in accordance with a preferred embodiment of the present invention.

Referring to FIG. 11, a flow diagram of a method for accurate prediction of sector failure in accordance with a preferred embodiment of the present invention is shown. Method 1100 may begin, at step 1102, by performing a satisfaction check on at least one sector, at step 1104, receiving an indication of a satisfied check, and, at step 1106, receiving and storing an indication of an unsatisfied check. Method 1100 may continue by, at step 1108, storing a location of the unsatisfied check and a number of unsatisfied checks, for each one of a plurality of local iterations, and, at step 1110, storing the location of the unsatisfied check and the number of unsatisfied checks for each one of a plurality of global iterations, one global iteration being equal to 10 local iterations, and, at step 1112, analyzing the number and location of the unsatisfied checks between a first global iteration and at least one other global iteration. Method 1100 may continue by, at step 1114, determining if a periodic pattern exists between the number and location of the unsatisfied checks in the first global iteration and number and location of the unsatisfied checks in the at least one other global iteration, and, at step 1116, identifying, as the sector prone to failure, a sector having a determined periodic pattern. Method finally, at step 1118, removes the identified sector from further use, and, at step 1120, reports, to a user via a display, the number and location of the unsatisfied checks for the identified sector.

It should be recognized that while the above description describes the concept of server driven de-duplication or server memory, the above description does not represent a limitation but merely an illustration.

In the present disclosure, the methods disclosed may be implemented as sets of instructions or software readable by a device. Such software may a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for identification of a sector prone to failure, comprising:
   performing a satisfaction check on at least one sector;
   receiving an indication of a satisfied check;
   receiving and storing an indication of an unsatisfied check;
   storing a location of the unsatisfied check and a number of unsatisfied checks, for each one of a plurality of local iterations;
   storing the location of the unsatisfied check and the number of unsatisfied checks for each one of a plurality of global iterations, one global iteration being equal to 10 local iterations;
   analyzing the number and location of the unsatisfied checks between a first global iteration and at least one other global iteration;
   determining if a periodic pattern exists between the number and location of the unsatisfied checks in the first global iteration and number and location of the unsatisfied checks in the at least one other global iteration;
   identifying, as the sector prone to failure, a sector having a determined periodic pattern;
   removing the identified sector from further use; and
   reporting, to a user via a display, the number and location of the unsatisfied checks for the identified sector.

2. The system of claim 1, wherein said removing the identified sector from further use further comprises reducing local iterations, from 10 to zero by one local iteration per each future global iteration, of the identified sector global iterations prior to removing the identified sector from further use.

3. The system of claim 1, wherein said indication of a satisfied check further includes a location of the satisfied checks and the number of satisfied checks for each local iteration.

4. The system of claim 1, wherein said storing the location of the unsatisfied check and the number of unsatisfied checks for each one of a plurality of global iterations further comprises storage in a format recognizable by a pattern recognition algorithm.

5. The system of claim 1, wherein said analyzing the number and location of the unsatisfied checks between a first global iteration and at least one other global iteration further comprises an analysis of the number and location of unsatisfied checks of each global iteration with the number and location of unsatisfied checks of each future global iteration.

6. The system of claim 1, wherein said determining if a periodic pattern exists between the number and location of the unsatisfied checks in the first global iteration and number and location of the unsatisfied checks in the at least one other global iteration further comprises an analysis of at least one of: a slope, a number of unsatisfied checks per global iteration, a location of unsatisfied checks of the global iteration, a magnitude of change between unsatisfied checks of each local iteration, and a rate of change of unsatisfied checks of between each local iteration.

7. The system of claim 1, wherein said identifying, as the sector prone to failure, a sector having a determined periodic pattern further comprises a comparison a pattern associated with past failed sectors to the pattern of the sector having a determined periodic pattern.

8. The system of claim 1, wherein said determined periodic pattern further comprises at least one of: a linear pattern, a geometric pattern, an association sequence, an aggregated sequence, and a periodicity.

9. The system of claim 1, wherein said removing the identified sector from further use further comprises a removal from service timed for maximum power savings.

10. The system of claim 1, wherein said reporting, to a user via a display, the number and location of the unsatisfied checks for the identified sector further comprises assembling and transmitting identified sector failure data in a format recognizable by an entity external to the method.

11. A system for identification of a sector prone to failure, the system comprises a computer readable medium having non-transitory computer readable program code embodied therein for identification of a sector prone to failure, the computer readable program code comprising instructions which, when executed by a computer device or processor, perform and direct the steps of:
   performing a satisfaction check on at least one sector;
   receiving an indication of a satisfied check;
   receiving and storing an indication of an unsatisfied check;
   storing a location of the unsatisfied check and a number of unsatisfied checks, for each one of a plurality of local iterations;
   storing the location of the unsatisfied check and the number of unsatisfied checks for each one of a plurality of global iterations, one global iteration being equal to 10 local iterations;
   analyzing the number and location of the unsatisfied checks between a first global iteration and at least one other global iteration;
   determining if a periodic pattern exists between the number and location of the unsatisfied checks in the first global iteration and number and location of the unsatisfied checks in the at least one other global iteration;
   identifying, as the sector prone to failure, a sector having a determined periodic pattern;
   removing the identified sector from further use; and
   reporting, to a user via a display, the number and location of the unsatisfied checks for the identified sector.

12. The system of claim 11, wherein said removing the identified sector from further use further comprises reducing local iterations, from 10 to zero by one local iteration per each future global iteration, of the identified sector global iterations prior to removing the identified sector from further use.

13. The system of claim 11, wherein said indication of a satisfied check further includes a location of the satisfied checks and the number of satisfied checks for each local iteration.

14. The system of claim 11, wherein said storing the location of the unsatisfied check and the number of unsatisfied checks for each one of a plurality of global iterations further comprises storage in a format recognizable by a pattern recognition algorithm.

15. The system of claim 11, wherein said analyzing the number and location of the unsatisfied checks between a first global iteration and at least one other global iteration further comprises an analysis of the number and location of unsatisfied checks of each global iteration with the number and location of unsatisfied checks of each future global iteration.

16. The system of claim 11, wherein said determining if a periodic pattern exists between the number and location of the unsatisfied checks in the first global iteration and number and location of the unsatisfied checks in the at least one other global iteration further comprises an analysis of at least one of: a slope, a number of unsatisfied checks per global iteration, a location of unsatisfied checks of the global iteration, a magnitude of change between unsatisfied checks of each local iteration, and a rate of change of unsatisfied checks of between each local iteration.

17. The system of claim 11, wherein said identifying, as the sector prone to failure, a sector having a determined periodic pattern further comprises a comparison a pattern associated with past failed sectors to the pattern of the sector having a determined periodic pattern.

18. The system of claim 11, wherein said determined periodic pattern further comprises at least one of: a linear pattern, a geometric pattern, an association sequence, an aggregated sequence, and a periodicity.

19. The system of claim 11, wherein said removing the identified sector from further use further comprises a removal from service timed for maximum power savings.

20. The system of claim 11, wherein said reporting, to a user via a display, the number and location of the unsatisfied checks for the identified sector further comprises assembling and transmitting identified sector failure data in a format recognizable by an entity external to the system.

* * * * *